US010127002B2

(12) United States Patent
Glazer

(10) Patent No.: US 10,127,002 B2
(45) Date of Patent: Nov. 13, 2018

(54) METHOD FOR REAL-TIME MULTIMEDIA INTERFACE MANAGEMENT

(71) Applicant: SCREENOVATE TECHNOLOGIES LTD., Ra'anana (IL)

(72) Inventor: Joshua Glazer, Ra'anana (IL)

(73) Assignee: SCREENOVATE TECHNOLOGIES LTD., Ra'anana (IL)

( * ) Notice: Subject to any disclaimer, the term of this patent is extended or adjusted under 35 U.S.C. 154(b) by 0 days.

(21) Appl. No.: 14/683,284

(22) Filed: Apr. 10, 2015

(65) Prior Publication Data

US 2015/0293741 A1 Oct. 15, 2015

Related U.S. Application Data

(60) Provisional application No. 61/977,714, filed on Apr. 10, 2014.

(51) Int. Cl.
*G09G 5/00* (2006.01)
*G06F 3/14* (2006.01)

(52) U.S. Cl.
CPC ... *G06F 3/1454* (2013.01); *G09G 2320/0613* (2013.01); *G09G 2354/00* (2013.01); *G09G 2370/16* (2013.01)

(58) Field of Classification Search
CPC ......... G06F 3/1454; G06F 3/147; G09G 5/12; G09G 2354/00; G09G 2370/16; G09G 2320/0613
USPC .................................. 345/1.1, 3.1; 715/748
See application file for complete search history.

(56) References Cited

U.S. PATENT DOCUMENTS

| 2012/0047526 A1* | 2/2012 | Hussain ................. G09G 5/005 725/25 |
| 2013/0009871 A1* | 1/2013 | Kubota .................. G09G 5/393 345/157 |
| 2013/0223538 A1* | 8/2013 | Wang .................. H04N 21/4307 375/240.25 |
| 2013/0328747 A1* | 12/2013 | Yoneda ................. G06F 3/1423 345/3.1 |
| 2014/0359477 A1* | 12/2014 | Chen ................... H04L 67/1095 715/748 |
| 2015/0135238 A1* | 5/2015 | Wickenkamp ..... H04N 21/4122 725/80 |
| 2015/0179143 A1* | 6/2015 | Subramaniam ....... H04L 67/025 345/2.3 |

* cited by examiner

*Primary Examiner* — Jennifer Nguyen
(74) *Attorney, Agent, or Firm* — Browdy and Neimark, P.L.L.C.

(57) ABSTRACT

The present invention provides a method for managing multimedia session on of receiver module associated or integrated with an external display and in communication with multiple touch enabled devices, The receiver device having processor and communication module for supporting streaming multimedia applications. The method comprising the steps of: reverse mirroring of activated multimedia applications from the receiver module to a touch enabled devices through direct local wireless communication network; and concurrently or non-concurrently, selecting at least one touch enabled device as current input device based on predefined rules of the currently running multimedia application and/or user selection and conveying input data from at least one selected touch enabled device in real-time to the receiver device through direct local wireless communication network.

6 Claims, 5 Drawing Sheets

340A

Switching module 1(gaming)

reverse mirroring of activated multimedia applications from the receiver module to a touch enabled devices through direct local wireless communication network; and concurrently or non-concurrently  /3410A selecting at least one touch enabled device as current input device based on predefined rules of the currently running multimedia application and/or user selection  /3420A conveying input data from at least one selected touch enabled device in real-time to the receiver device through direct local wireless communication network  /3430A

METHOD FOR REAL-TIME MULTIMEDIA INTERFACE MANAGEMENT

TECHNICAL FIELD

The present invention relates to the field of multimedia interface management, and more particularly, to mirroring multimedia interface and applications between two different computerized communication devices.

SUMMARY OF INVENTION

The present invention provides a method for managing multimedia session of a receiver module associated or integrated with an external display and in communication with multiple touch enabled devices. The receiver device has a processor and a communication module for supporting streaming multimedia applications. The method comprises reverse mirroring of activated multimedia applications from the receiver module to a touch enabled device through a direct local wireless communication network; and concurrently or non-concurrently, selecting at least one touch enabled device as a current input device based on predefined rules of the currently running multimedia application and/or user selection; and conveying input data from at least one selected touch enabled device in real-time to the receiver device through the direct local wireless communication network.

According to some embodiments of the present invention, the pre-defined rules are implemented by a priority queue, defining a priority for each type for application, such that the predefined rules select the current input device which is running the application with the highest priority.

According to some embodiments of the present invention, the pre-defined rules are determined by the current application running on the dongle device.

According to some embodiments of the present invention, the pre-defined rules are determined by the current input device to determine the next input device to be selected.

According to some embodiments of the present invention, the current input device enables the user of the device to select the next input device.

According to some embodiments of the present invention, the pre-defined rules are based on a current use case of the running application, including at least one of: the type of content, and characteristics of application usage.

According to some embodiments of the present invention, the pre-defined rules, are based on an identifying operation performed by the user.

The system provides a system for managing multimedia session of a receiver module associated or integrated with an external display and in communication with multiple touch enabled devices, said receiver device having a processor and a communication module for supporting streaming multimedia applications, said system comprised of: a mirroring module for reverse mirroring of activated multimedia applications from the receiver module to a touch enabled devices through a direct local wireless communication network; and a switching module for concurrently or non-concurrently selecting at least one touch enabled device as a current input device based on predefined rules of the currently running multimedia application and/or user selection and conveying input data from at least one selected touch enabled device in real-time to the receiver device through the direct local wireless communication network.

According to some embodiments of the present invention, the pre-defined rules are implemented by priority queue, defining a priority for each type for application, such that the predefined rules select the current input device which is running the application with the highest priority.

According to some embodiments of the present invention, the pre-defined rules are determined by the current application running on the dongle device.

According to some embodiments of the present invention, the pre-defined rules are determined by the current input device to determine the next input device to be selected.

According to some embodiments of the present invention, the current input device enables the user of the device to select the next input device.

According to some embodiments of the present invention, the pre-defined rules are based on a current use case of the running application, including at least one of: the type of content, and characteristics of application usage.

According to some embodiments of the present invention, the pre-defined rules, are based on an identifying operation performed by the user.

According to some embodiments of the present invention, the switching module is implemented at the touch enabled device.

According to some embodiments of the present invention, the switching module is implemented at receiver module.

According to some embodiments of the present invention the switching module is implemented partly at receiver module and partly at the touch enabled device.

These, additional, and/or other aspects and/or advantages of the present invention are: set forth in the detailed description which follows; possibly inferable from the detailed description; and/or learnable by practice of the present invention.

BRIEF DESCRIPTION OF DRAWINGS

FIG. 5 is a flowchart illustrating interaction module activities providing full mirroring of the receiver device, according to some embodiments of the invention.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The term "touch enabled device" as used herein in this application, is defined as a mobile device having a touch screen with capability of running applications as well as streaming multimedia data to a screen that is external to the computerized mobile device (e.g. a mobile phone or a tablet device).

The term "receiver module" as used herein in this application, is defined as a processing communication module embedded in a dongle device or integrated in external screen, such as TV or monitor device, which supports managing activating and streaming multimedia applications.

The term "multimedia application" as used herein in this application, is defined as an application which generate images, video or sound objects, such as video application, gaming application, chatting application or advertizing.

Figure 1:
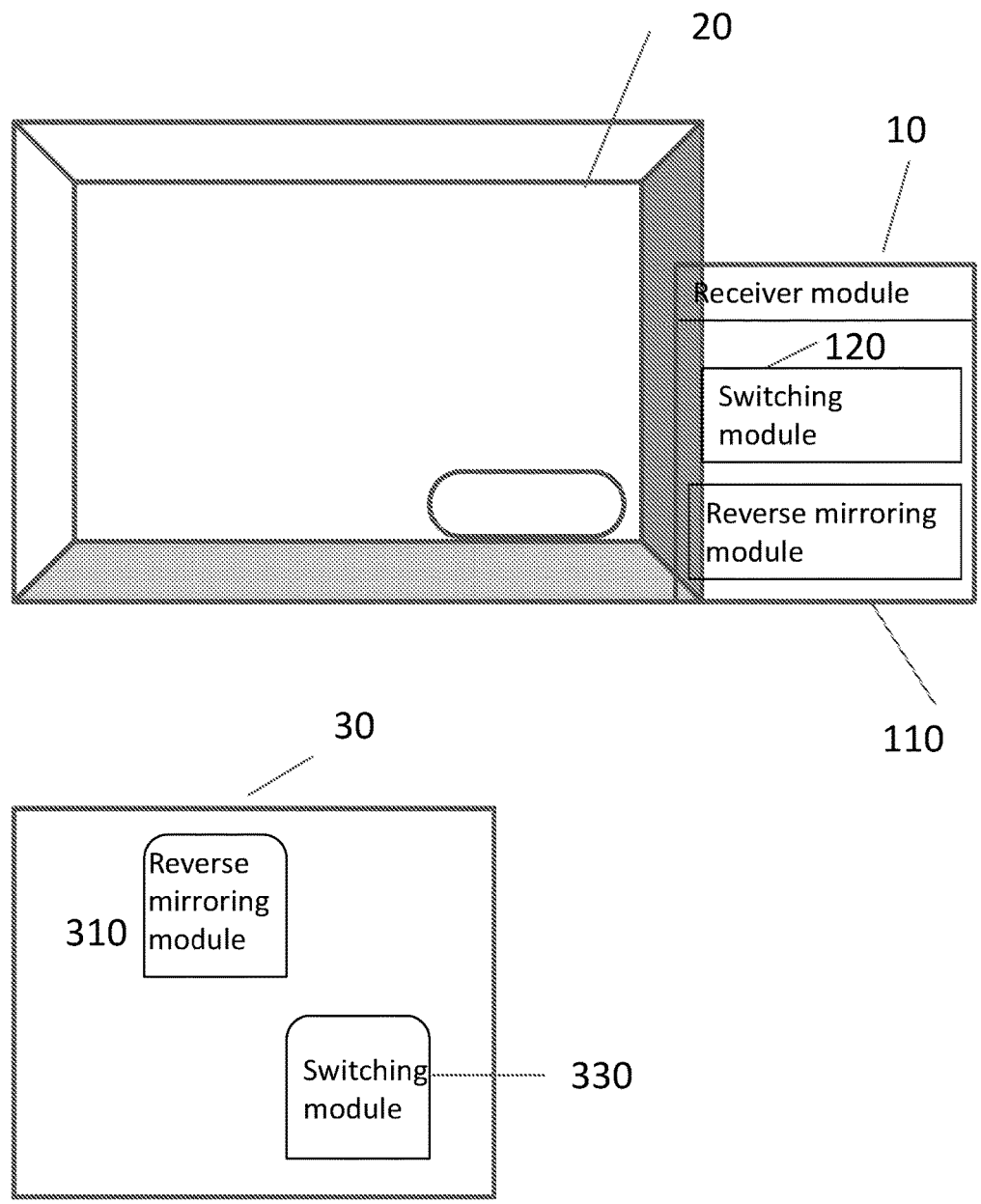
FIG. 1 is a block diagram of the system components and modules, according to some embodiments of the invention.

FIG. 1 is a block diagram of the system components and modules, according to some embodiments of the invention. The system of the present invention includes a receiver module 10 which may be embedded in a dongle device or integrated in external screen such as TV or monitor device. The receiver module 10 interacts with a touch enabled device, which is designated to function as interface device for the receiver module for managing multimedia applications. This interfacing interaction is enabled by mirroring modules 110, 310 for streaming back the interface of the receiver module and the running application to the touch enabled device. These mirroring modules 110, 310 can be implemented, partly at the receiver module or the touch enabled device or partly at the touch enabled device. Interaction modules 120, 130 support conveying input data and sensor data from the touch enabled device, to the receiver module to enable full interface functionality. These interaction modules can be implemented, partly at the receiver module or the touch enabled device or partly at the touch enabled device.

According to some embodiments of the present invention, the reviver module and the touch enabled device are in communication with one another through a direct local wireless network such as WIFI direct, or Bluetooth. Optionally, the devices are connected though global wireless or wired network using cellular network or the Internet.

According to some embodiments of the present invention, it is suggested to provide switching module 340 at the touch enabled device, to enable dynamic switching of interface and activation control between at least one touch enable device and the receiver module.

According to some embodiments of the present invention, it is suggested to provide switching module 340 at the receiver module, to enable dynamic switching of interface and activation control between at least one touch enable device and the receiver module.

Optionally, the switching module may be implemented partly on the mobile device and partly at the receiver module.

Figure 2:
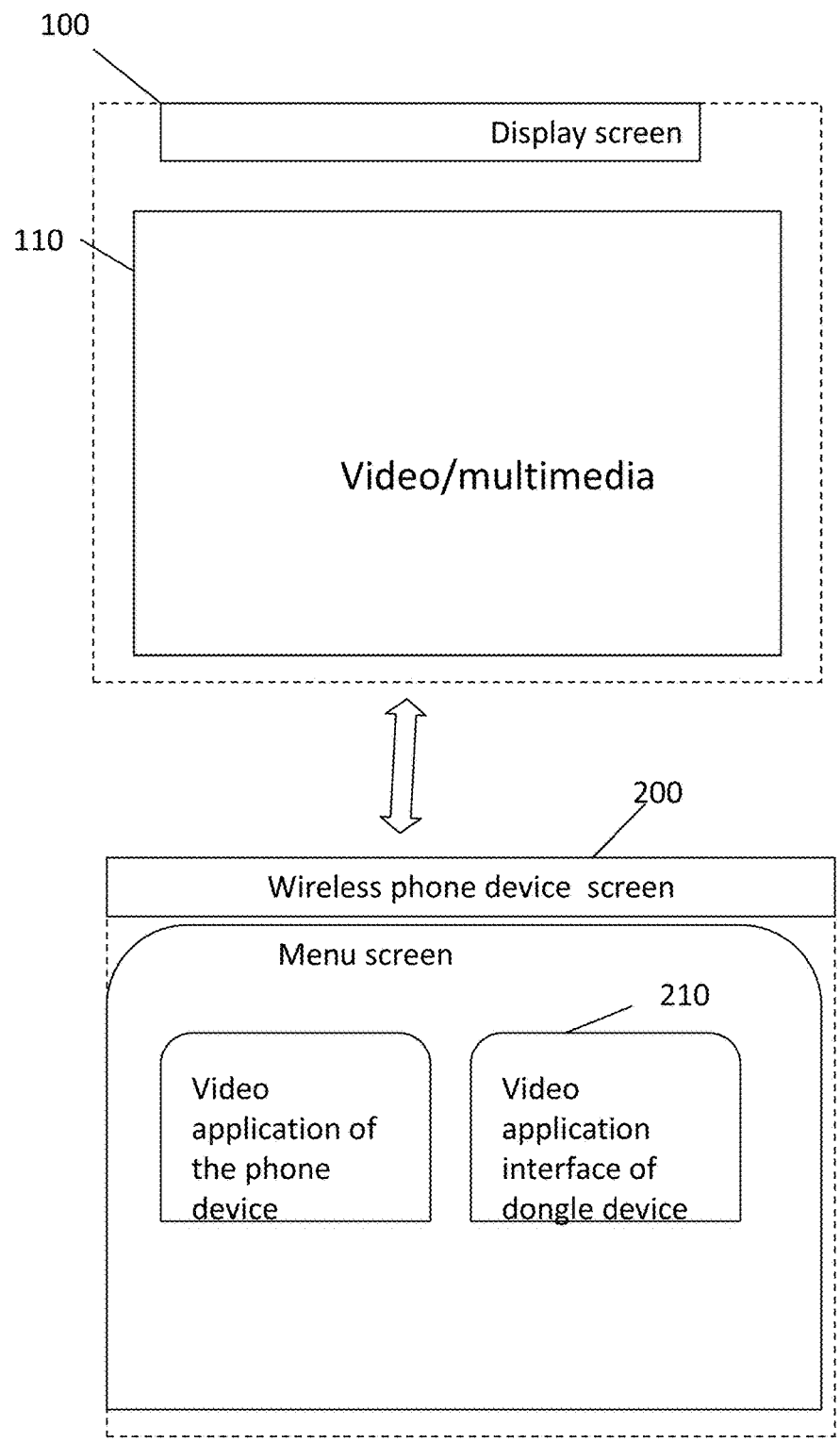
FIG. 2 shows the display screen on the touch enabled device and on an external screen, according to some embodiments of the invention.

FIG. 2 shows the display screens on the touch enabled device and on an external screen, according to some embodiments of the invention.

Figure 3:
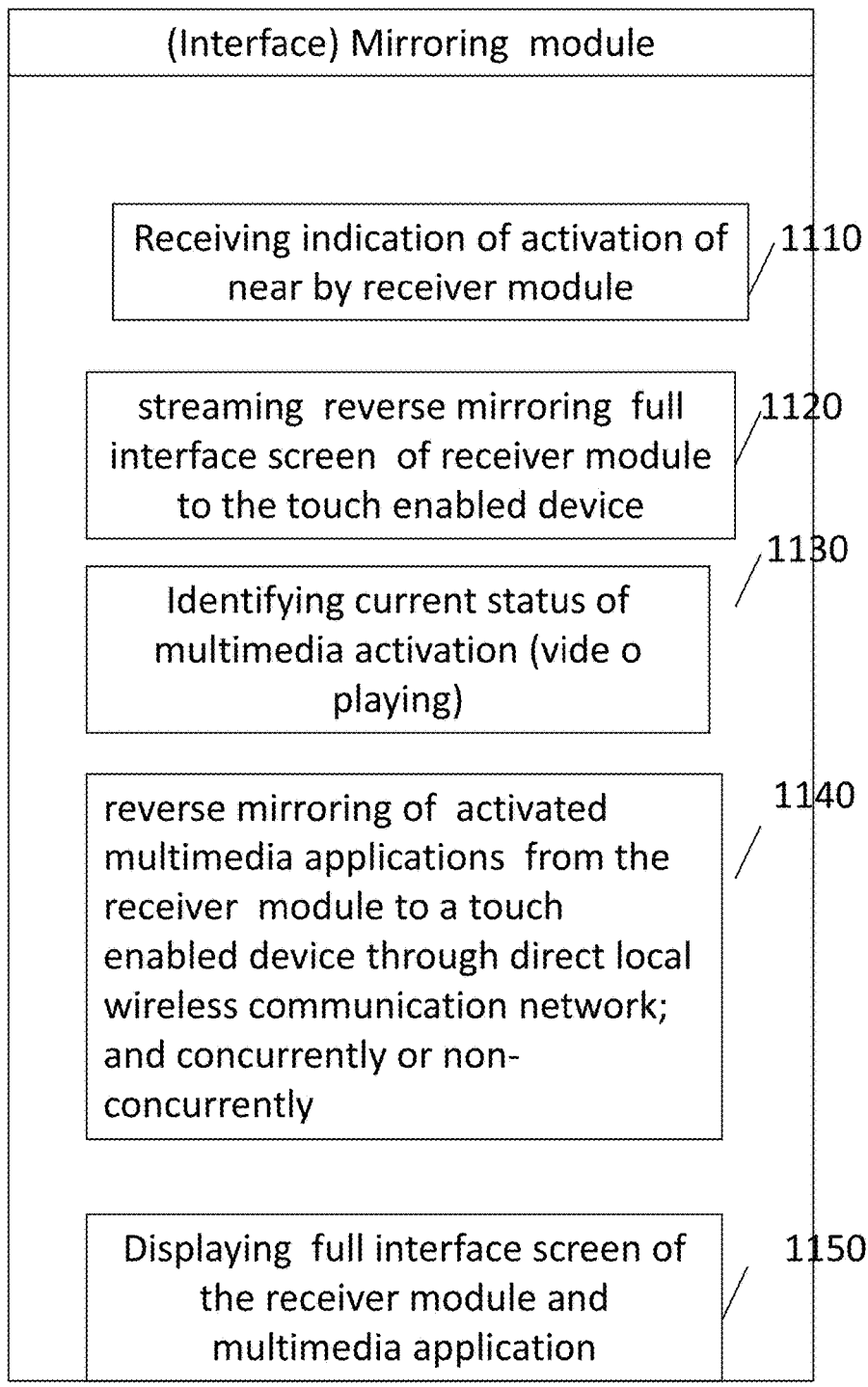
FIG. 3 is a flowchart illustrating mirroring module activities providing full mirroring of the receiver device, according to some embodiments of the invention.

FIG. 3 is a flowchart illustrating mirroring module activities providing full mirroring of the receiver device, according to some embodiments of the invention. The mirroring module functioning as a full interface, implements at least one of the following steps: receiving an indication of activation of a nearby receiver module (step 1110), streaming a reverse mirroring full interface screen of the receiver module to the touch enabled device (step 1120), identifying the current status of multimedia activation (e.g. video starts playing) (step 1130), reverse mirroring of activated multimedia applications from the receiver module to a touch enabled device through a direct local wireless communication network, concurrently or non-concurrently (step 1140) displaying a full interface screen of the receiver module and the multimedia application (step 1150) including full movie video stream or gaming video. The reverse mirroring may be implemented by WIFI direct protocols or optionally using global communication network such as TCP/IP.

The full mirroring stream from the receiver to the touch enabled device includes: for an audio stream: audio being played on the receiver is transmitted to the touch enabled device, and played on it; and for a video stream: the entire video content being displayed on the receiver device internal display is transmitted to the touch enabled device, and displayed on it.

The full mirroring stream from the touch enabled device to the receiver may further includes:

Sensor information: all input being received from sensors (Touch screen input, Gyroscope movement, Accelerometer input) is transmitted to the receiver, which processes the input as if the actions detected by the sensors were performed on the receiver itself.

Peripheral information: all input generated by external devices such as printers, speakers etc. connected to the touch enabled device (e.g. via a Host Controller Interface (HCI)) are transmitted to the receiver and processed by receiver, as if these devices were actually connected to that receiver.

Figure 4:
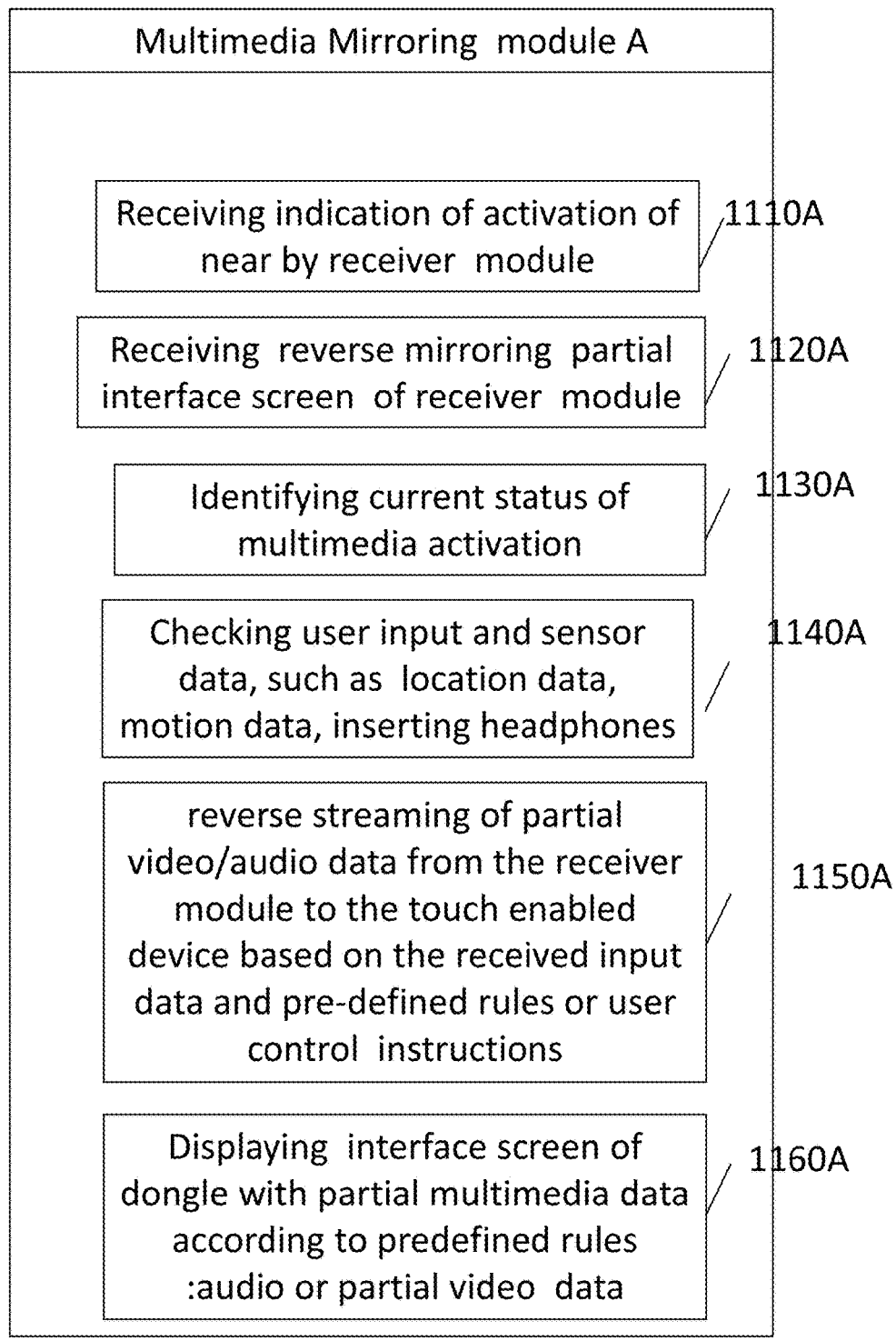
FIG. 4 is a flowchart illustrating mirroring module activities providing full mirroring of the receiver device, according to some embodiments of the invention.

FIG. 4 is a flowchart illustrating mirroring module activities providing partial mirroring of the receiver device, according to some embodiments of the invention. The mirroring module functioning as partial dynamic interface, implements at least one of the following steps: receiving an indication of activation of a nearby receiver module (step 1110A), receiving reverse mirroring of a partial interface screen of the receiver module (step 1120A), identifying a current status of multimedia activation (step 1130A), checking user input and measured sensor data of the touch enabled device, such as location data, motion data or inserting headphones (step 1140A), reverse streaming of partial video/audio data from the receiver module to the touch enabled device based on the received input data and predefined rules or user control instructions (step 1150A) and/or displaying an interface screen of the receiver module with partial multimedia data according to predefined rules (step 1160). The predefined rules may relate to different scenarios when using a multimedia application such a video and gaming application. One scenario may be defined to include only control functionality (e.g. pause, play) of a video application, while the video itself is displayed only on the external screen. In the same scenario, it may be defined to check the location of the touch enabled device using a GPS sensor embedded within the touch enabled device, and in the case of identifying the user having walked away from the external screen, based on the predefined rules, it is instructed to include the video itself to be displayed on the touch enabled device, enabling the user to keep viewing the streamed video when leaving the area where the external screen is visible. According to a second scenario, it is defined to identify connection of a headphone to the touch enabled device, and in such case predefined rules instruct the audio stream of a video currently running on receiver to be conveyed to the touch display device. According to a third scenario, the touch enabled device is enabled to display movie subtitles, not appearing at the external display.

Basic Scenarios Uses Cases
1. Sending only audio from the dongle to the device—this can be used when watching a movie on the dongle, while listening to its audio track using headphones connected to the hand held device.
2. Sending the screen of a video player application, while dropping the video part of the display (i.e. showing a placeholder image where the movie would have been), thus transmitting only the relevant information for control needs.
3. Decreasing video stream parameters (decreasing the bitrate, frame rate or resolution) of the receiver's display, thus transferring a complete look and feel of the receiver screen, while requiring less network bandwidth.

Implementations Examples of Use Cases:
1. Identifying a new connection to headset (or earphones)—upon identification a pre-defined rule, determines only audio is transmitted back to the device.
2. In case of identifying a video playback session, the pre-defined rule determines that audio is not transmitted at all and video is removed from the screen and performs degradation of the streaming quality of the control interface as the user experience will not be affected much by degrading the frame rate of the UI elements motion.
3. in case of a games playing session, the pre-defined rule determines to decrease the video parameters, while sending all sensor information to the dongle.
4. in case of static applications, according to the pre-defined rules identifying the user who shows a mostly static information (e.g. showing a picture slideshow), decreasing the frame rate significantly (while increasing the bit rate) to provide a crisp picture, while taking into consideration the fact that there is no need for smooth movement at the time.

FIG. 5 is a flowchart illustrating switching module activities providing switching interface control between at least two touch enabled devices, according to some embodiments of the invention. The switching module implements at least one of following: reverse mirroring of activated multimedia applications from the receiver module to at least two touch enabled devices through a direct local wireless communication network (step 3410), concurrently or non-concurrently selecting at least one touch enabled device as a current input device, based on predefined rules of the currently running multimedia application and/or user selection (step 3420) and/or conveying input data from at least one selected touch enabled device in real-time to the receiver device through the direct local wireless communication network (step 3430). Such a switching scenario may be implemented in a game application, enabling to change the control over the game between the gamers, based on game application settings or according to gamer selection.

According to some embodiments of the present invention, the predefined rules are determined by the current application running on the dongle device, using designated API.

Optionally, the pre-defined rules are determined by the current input device to determine the next input device to be selected. Optionally, the current input device enables the user of the device to select the next input device.

According to some embodiments of the preset invention, the predefined rules are determined by analyzing the operation of the user.

According to some embodiments of the preset invention, several policies are provided for selecting the current input device of non-combinable events, such as a gyroscope and an accelerometer.

One protocol may implement a dynamic priority queue enabling a dynamic change of a specific device priority. For example, one type of applications (such as application games) may receive higher priorities than others, such as standard apps, which have a higher priority than home screens.

The current input device is selected by checking the currently running application on each device, and selecting the device which has an application with the highest priority.

If multiple devices are running with the same priority, we can choose the device that connected the earliest or by defining default device.

According to some embodiments of the present invention, the switching module is installed on the touch enabled device. Optionally, the predefined rules relate to all applications running on the touch enable device or the receiver module. Optionally, the rules may customized for each application, based on application type or as specified by the application itself using a designated API. Optionally, the predefined rules are based on an identified use case. The use case may relate to the type of the running application, the type of content (text, video, image) or characteristics of application usage, including interactive application such as game or more passive application such as video or text applications.

According to some embodiments of the present invention, it is suggested to select the current input device based on a user's selection by popping a window on screen asking the current input device to switch inputs to a different participant.

In case the input data is combinable input data—such as touch events, modern operating systems (such as ANDROID) support receiving touch screen input from multiple fingers at the same time. Accordingly, such input data protocol support, sending and receiving at the dongle device data from multiple devices, when the OS at the target (the dongle) addresses them just as multiple different fingers. In such a case, the dongle device can receive an input from multiple device and there is no need to select only one device as the current device.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

What is claimed is:

1. A method for managing a currently running multimedia application of a video application or a gaming application displayed on an external display said method comprising:
   transmitting a display of the currently running multimedia application to the external display from a receiver device having a processor and a communication module configured and operable to support streaming multimedia applications;
   reverse mirroring the multimedia application from the receiver device to two or more touch enabled devices through a direct local wireless communication network;
   before receiving a user control instruction, selecting one of the two or more touch enabled devices as a current input device based on predefined rules that are customized for each type of multimedia application based on the application type; and
   conveying a user control instruction only from the current input device in real-time to the receiver device, through the direct local wireless communication network, to control the currently running multimedia application displayed on the external display and on the two or more touch enabled devices.

2. The method of claim 1, wherein the user control instruction is one of an instruction to pause or play the currently running multimedia application displayed on the external display and on the two or more touch enabled devices.

3. The method of claim 1, wherein the user control instruction comprises combinable instruction data of touch events, wherein an operating system of the current input device supports receiving touch screen events from multiple fingers at the same time, wherein a control data protocol supports sending and receiving at the external display device data from multiple mobile devices, and wherein the operating system at the external display addresses the data from multiple mobile devices as multiple different fingers.

4. A system for managing a currently running multimedia application of a video application or a gaming application displayed on an external display said system comprised of:
- a receiver device comprising a processor and a communication module configured and operable to: transmit a display of the currently running multimedia application to the external display, reverse mirror the currently running multimedia application to two or more touch enabled devices through a direct local wireless communication network, and, before receiving a user control instruction, selecting one of the two or more touch enabled devices as a current input device based on predefined rules that are customized for each multimedia application based on the application type; and
- the two or more touch enabled devices, each configured and operable to convey, only when selected as the current input device, a user control instruction in real-time to the receiver device through the direct local wireless communication network to control the currently running multimedia application displayed on the external display and on the two or more touch enabled devices.

5. The system of claim 4, wherein a type of the currently running multimedia application is one of a text, image, video, or game, and wherein the pre-defined rules give a priority in the selection of the current input device based on the type of the multimedia application.

6. The system of claim 4, wherein the control instruction is one of an instruction to pause or play the currently running multimedia application.

* * * * *